United States Patent Office 2,871,208
Patented Jan. 27, 1959

2,871,208

OIL SOLUBLE BUTENYLPHENOL FORMALDEHYDE RESINS

Roger M. Christenson, Whitefish Bay, and Lowell O. Cummings, Milwaukee, Wis., assignors to Pittsburgh Plate Glass Company No Drawing. Application May 3, 1954
Serial No. 427,385

7 Claims. (Cl. 260—19)

This invention relates to novel varnish compositions, and pertains more particularly to oleoresinous type varnishes, the resinous component of which is a phenolic resin obtained by the condensation of a mixture of alkenylphenols with an aldehyde.

Among the synthetic resins used as ingredients of varnishes and related coating compositions are those of the alkyl-phenol-formaldehyde, alkyd, maleic, urea-formaldehyde, coumarone-indene, acrylic, vinyl, and polystyrene type. The alkylphenol-formaldehyde resins are important from the commercial standpoint. Even the alkylphenol-aldehyde resins, however, possess certain disadvantages; for example, they produce slow bodying and drying varnishes with most drying oils including linseed oil and soybean oil. Consequently, in order to obtain a fast bodying and drying varnish utilizing an alkyl-phenol-formaldehyde resin, it is necessary to employ as the drying oil component thereof, special drying oils such as tung oil, which is much more expensive than linseed or soybean oil and which is not always available in quantities sufficient to meet the needs therefor.

It is known that resins prepared by the condensation of an alkenylphenol, such as o-crotylphenol, with formaldehyde, are compatible with drying oils and can be used to form coating compositions. However, the resins obtained in this manner tend to be an undesirable red in color and consequently find but little application as varnish resins. Such resins also produce slow drying films, requiring several hours of heating at 125° C. to 150° C.

In copending applications, Serial Nos. 390,088 and 390,089, both filed November 3, 1953, it is disclosed that light colored, fast curing resins can be obtained by condensing a mixture of alkenylphenols, ordinarily including mono-, di- and trialkenylphenols, with an aldehyde, particularly formaldehyde.

It has now been discovered that the light colored resins obtained by condensing mixtures of alkenylphenols with an aldehyde are very compatible with drying oils and semi-drying oils, and give fast bodying and drying compositions, even when economical drying oils such as linseed oil and soybean oil are utilized as the oil component of the varnish composition. Thus, by utilizing resins of the type dislosed in the copending applications referred to hereinabove, it is possible to obtain light colored, fast bodying and fast drying varnish compositions utilizing inexpensive drying oils, a combination of useful properties which it has not been possible to obtain from phenol-aldehyde resins employed heretofore. Moreover, the hardness, impact resistance, mar resistance, flexibility and toughness of the resulting varnish compositions are entirely satisfactory for most applications.

The mixture of alkenylphenols which is condensed with an aldehyde to give the resins utilized in preparing the varnish compositions of the present invention may vary widely in composition. Ordinarily, the predominant component of the mixture is one or more monoalkenylphenols (including ortho- and para-monoalkenylphenols), the monoalkenyl component constituting about 55 percent to 85 percent by weight of the total mixture. The balance of the mixture (about 15 percent to 45 percent) is composed primarily of di- and trialkenylphenols, although other phenolic materials, including polyphenols such as alkane di- and triphenols may also be present, depending upon the method by which the alkenylphenol mixture is prepared.

Mixtures of alkenylphenols of the type described in the foregoing paragraph are readily obtained by the methods described in copending applications, Serial No. 300,359, filed July 22, 1952, and Serial Nos. 337,226, 337,227, 337,228 and 337,229, all filed February 16, 1953, the latter two applications are now abandoned. The methods described in these copending applications involve the reaction of conjugated dienes with phenolic compounds in the presence of certain catalysts such as the Friedel-Crafts compounds. For example, the product obtained by the reaction of butadiene-1,3 and phenol in the presence of an aqueous sulfuric acid catalyst is generally composed of less than about 15 percent unreacted phenol, less than about 5 percent of ethers, 55 to 70 percent of monobutenylphenols and 15 to 50 percent of the higher boiling phenols including di- and tributenylphenols and polyphenols. Ordinarily, the unreacted phenol and ethers will be removed from the reaction mixture by distillation before the condensation reaction with an aldehyde is carried out; however, this is not a critical expedient and the condensation reaction takes place readily even though the unreacted phenols and ethers are not removed. Mixtures containing smaller quantities of monoalkenylphenols and larger quantities of the higher boiling phenols, for example, about 50 percent monoalkenylphenols and 30 to 50 percent of higher boiling phenols and the balance polyphenols and ethers, may also be employed with good results, as may mixtures containing no monoalkenylphenols. Also, the mixture may be composed entirely of ortho- and para-monoalkenylphenols, and in fact, excellent resins are obtained when such a mixture is employed. Mixtures of alkenylphenols with minor amounts of other phenols containing no unsaturated side chain, such as phenol, butylphenol, amylphenol and the like may also be used.

It is to be understood that mixtures of alkenylphenols can also be obtained by other methods known to the art in addition to the reaction of conjugated dienes with phenolic compounds, and it is intended that the present invention include the use of any mixture of alkenylphenols regardless of the method whereby it is obtained.

As illustrative of the alkenyl substituted phenolic compounds which in admixture are condensed with an aldehyde to form the novel resins of the present invention there are set forth below the products of the reaction of butadiene-1,3 and phenol:

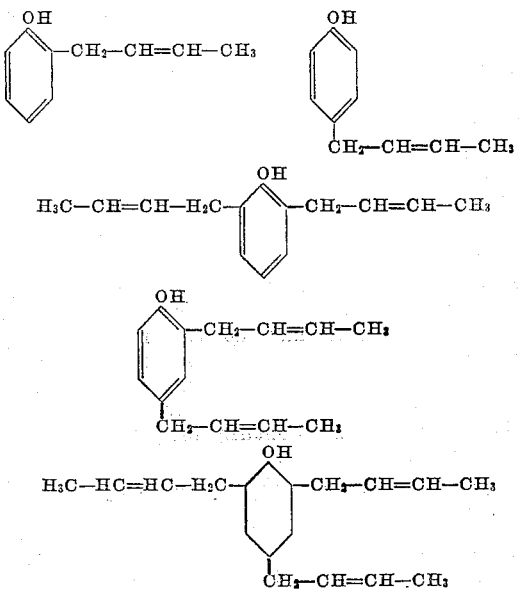

A mixture of the above alkenylphenols forms excellent resins when condensed with an aldehyde in the presence of an alkaline catalyst.

In general, the alkenylphenolic compounds in the mixtures condensed with aldehydes possess the structure $R_n$—Ar—$(OH)_{n_1}$ wherein Ar is an aromatic radical, R is alkenyl, cycloalkenyl, haloalkenyl, halocycloalkenyl, alkoxyalkenyl or alkoxycycloalkenyl and $n$ and $n_1$ are whole numbers, ordinarily from 1 to 3. Preferably, the sum of $n$ and $n_1$ is from 2 to 4. The alkenyl compounds of the above structure are all readily obtained by the reaction of phenolic compounds with conjugated dienes in accordance with the methods described in the copending applications.

The preferred alkenylphenolic compounds for condensation with aldehydes in accordance with the present invention are mixtures of the butenylphenols, including ortho- and para-2-butenylphenols, di-2-butenylphenols and tri-2-butenylphenols. However, mixtures of other alkenylphenolic compounds may also be used, including butenylcresols, butenylcatechols, butenyl-2,3-dimethoxyphenols, mono-, di- and tributenylresorcinol, mono-, di- and tributenylguaiacol, 2-chlorobutenylcresol, 2-chlorobutenylphenol, 2-iodobutenylphenol, ortho- and para-cyclopentenylphenol, pentenylphenol, pentenylcresol, pentenylguaiacol, halopentenylphenols, halopentenylguaiacols, and the like.

It may be that the trialkenylphenols such as the tributenylphenols do not actually condense with aldehydes as do the mono- and dialkenylphenols, but instead react through the unsaturated linkages and the OH group. This type of reaction is, of course, not possible with conventional phenols and may account for the improved bodying and drying rates possessed by varnishes prepared utilizing as the resinous component the condensation product of a mixture of alkenylphenols with an aldehyde.

Any aldehyde may be utilized in the preparation of the resins of the present invention. However, aldehydes containing only atoms of carbon, hydrogen and oxygen, and particularly formaldehyde, are greatly preferred. In place of formaldehyde, a material which decomposes upon heating to yield formaldehyde, for example paraformaldehyde or trioxymethylene, may be utilized in the condensation reaction. An aqueous 37 percent formaldehyde solution is generally used very successfully.

In carrying out the condensation of a mixture of alkenylphenols with an aldehyde either an alkaline or acid catalyst is employed. Suitable alkaline materials include sodium hydroxide, potassium hydroxide, barium hydroxide, sodium carbonate, potassium carbonate, ammonia, hexamethylenetetramine and the like. Acidic materials which may be used include mineral acids such as sulfuric acid, hydrochloric acid, phosphoric acid, and organic carboxylic acids such as acetic acid, propionic acid, oxalic acid, and the like.

The quantity of catalyst utilized may be varied considerably. For example, when an alkaline catalyst is employed, it is generally desirable that about one-fourth equivalent of catalyst be present for each equivalent of alkenylphenolic compounds. Based upon the total weight of the reactants, about 0.5 percent to about 5.0 percent of the alkaline catalyst is used. When an acidic material is employed to catalyze the condensation reaction, it is also desirable that about 0.5 percent to about 5.0 percent, based upon the total weight of the reactants, be employed. Larger amounts of the catalyst may be utilized if desired.

Alternatively, the catalyst may be dispensed with entirely, although higher reaction temperatures may then be required with attendant increase in darkening of the resinous product.

The molar ratio of aldehyde to alkenylphenols utilized in carrying out the condensation reaction may be varied widely, and depends somewhat on whether an acidic or alkaline catalyst is used. When an alkaline catalyst is used, best results are obtained when about 2.0 moles of the aldehyde are utilized for each mole of the alkenylphenolic compounds in the reaction mixture. However, the ratio may be as low or lower than 0.5 to 1.0 or as high or higher than 5.0 to 1.0. When the ratio is much below the preferred 1.5 to 2.0 ratio the resinous product tends to be hard and more difficultly processable. When the ratio is substantially above 1.5 to 1.0 good results are obtained but there is no economical advantage in utilizing such large excess of the aldehyde.

On the other hand, when an acid catalyst is used, most useful resins are obtained when less than a mole of the aldehyde is employed for each mole of the alkenylphenolic component in the reaction mixture, with about 0.8 mole of aldehyde to 1.0 mole of the mixture of alkenylphenolic compounds apparently being the optimum. However, the ratio may be as low or lower than 0.5 to 1.0 or as high or higher than 5.0 to 1.0. When the ratio is substantially above 1.5 to 1.0 no advantage is obtained, and in fact, gels, rather than hard resins, may be formed. Consequently, the use of such an uneconomical excess is not particularly desirable.

The alkaline condensation reaction is best carried out by first admixing the alkenylphenols and the catalyst under an inert atmosphere such as nitrogen, and/or in the presence of sodium hydrosulfite, utilizing sufficient cooling to maintain the resulting reaction mixture at about room temperature (25° C.). When solution is obtained the aldehyde is added at a moderate rate and cooling is applied as needed to keep the temperature below about 35° C. Care should be taken to keep traces of air out of the reactor at all times during the condensation. Stirring is continued for about 48 hours at room temperature.

At the end of this time the reaction mixture is carefully acidified to a pH of about 5.0 with a mineral acid such as hydrochloric acid or sulfuric acid, or a carboxylic acid such as acetic acid or propionic acid. Two layers are formed, a water layer and an alkenylphenolic resin layer. The water layer is drawn off and the water-insoluble layer of resin is water washed 4 or 5 times. At this point it is advantageous to add about 0.1 percent by weight of a material such as an aminotetracarboxylic acid which forms a complex with any iron in the reaction mixture. The presence of uncomplexed iron is likely to cause darkening of the product. The resin is then dehydrated by vacuum stripping at steam temperatures and at a pressure of about 20 mm. to 55 mm. Alternatively, the water can be removed by adding butanol and then carrying out an azeotropic distillation.

While the above described method for carrying out the condensation is preferred, particularly when the alkenylphenol mixture is a mixture of butenylphenols, other methods of carrying out the condensation, for example, simply by admixing the reactants and catalyst and allowing the mixture to stand at room temperature for about 48 hours, or by maintaining the reaction mixture at temperatures as high as 100° C. or higher, may also be utilized. In the event that higher temperatures are utilized the condensation will, of course, require less time than when the condensation is carried out at room temperature.

While the resins obtained by the alkaline condensation of a mixture of alkenylphenols with an aldehyde such as formaldehyde are generally recovered as viscous liquids, it is also possible to obtain hard resinous materials by condensing equimolar quantities of alkenylphenols and aldehyde in the presence of an alkaline catalyst and then acidifying the reaction mixture to a pH of about 2.0. The resulting hard materials are especially useful as varnish resins.

The acid catalyzed condensation reaction is best carried out by first admixing the formaldehyde, or formaldehyde producing substance, with the mixture of alkenylphenols and the acidic catalyst. The resulting mixture is then heated to a temperature of about 50° C. to 150° C. for about 2 to 3 hours, after which the water present in the reaction mixture is stripped off by distillation at reduced pressure, leaving the desired resin as a hard, grindable material. The reaction can, however, also be carried out simply by admixing the reactants and the acidic catalyst and allowing the mixture to stand at room temperature for 48 hours, or by maintaining the reaction mixture at temperatures even higher than 150° C.

As indicated hereinabove, either the acid or alkaline catalyzed condensation product of a mixture of alkenylphenols and an aldehyde, or the condensation product obtained in the absence of any catalyst, may be utilized in the preparation of the varnish compositions of this invention. In preparing the varnish compositions, the resin prepared in the methods described above is first heated with a drying oil or a semi-drying oil. For convenience, the term drying oil, wherever used hereinafter, is intended to include semi-drying oils. Such oils include linseed oil, soybean oil, castor oil, wood oil or tung oil, oiticica oil, perilla oil, sardine oil, menhaden oil and the like. One preferred method of formulating the varnish composition consists in placing the entire amount of resin and about half of the charge of the drying oil into a reactor equipped with stirrer and heating means. The resulting mixture is then heated to about 230° C. to 240° C. under an atmosphere of an inert gas such as nitrogen or carbon dioxide and this temperature is maintained until a resin string of about 15 to 20 inches can be pulled from a cooled drop on a glass surface. At this point the remaining quantity of oil is added and the reaction mixture again held at the desired temperature until a 20 to 30 inch string is obtained. The completed reaction product is then poured into an equal amount of a solvent such as an aromatic or aliphatic naphtha, toluene, xylene or the like, to form the final varnish composition. Alternatively, all of the reactants can initiailly be charged into the reactor and heated to a temperature of about 300° C. under an inert atmosphere until a 25 to 30 inch string is obtained and the completed reaction product then poured into an equal quantity of a solvent to give the final varnish composition. Varnishes of any desired gallon oil length can be prepared by the above method, the term "gallon oil length," designating the number of gallons of oil used in the formulation per 100 pounds of resin. Generally, the oil length will vary between about 10 and 75 gallons, with those varnish compositions having a gallon oil length of 10 to 25 possessing the most satisfactory drying properties. Pigments, driers, and other additives may be incorporated in the varnish compositions if desired.

The following examples illustrate in detail the preparation of resinous condensation products from mixtures of alkenylphenols and aldehydes, and the use of the resulting products in the preparation of varnish compositions in accordance with the present invention. The examples are not, however, intended to limit the invention, inasmuch as there are, of course, numerous possible variations and modifications.

Example I

One hundred forty-eight parts of a mixture of monobutenylphenols (o- and p-monobutenylphenols) and 10 parts of sodium hydroxide in 100 parts of water were mixed under a nitrogen atmosphere with ufficient cooling to keep the temperature below about 35° C. When a homogeneous solution was obtained, 163 parts of 37 percent formalin, methanol free, containing 60 grams (2 moles) of solid formaldehyde, were added at a moderate rate and cooling was continued to keep the temperature below about 35° C. Stirring was continued for about 48 hours at room temperature. At the end of this time the reaction mixture was acidified to a pH of 5.0 with a mixture of concentrated hydrochloric acid and water (50 percent acid and 50 percent water) and the resulting water-insoluble layer of the resin was washed 4 times with lukewarm water. The resin was then dehydrated by vacuum stripping at steam temperatures under 20 mm. to 50 mm. pressure. The yield based on the quantity of alkenylphenols utilized was 120 percent, the viscosity at 25° C. was W to Z (Gardner), and the resulting resin was completely miscible with ethanol, butanol, toluene, and xylene.

Example II

Example I was repeated using each of the following formaldehyde:butenylphenol ratios: 0.8:1, 1:1, 2:1, and 4:1. In each run a resin was obtained which gave light colored, fast curing films and which was compatible with drying oils, varnishes, alkyd resins and a great many other film forming materials.

Example III

Several different aldehydes were condensed with mixed butenylphenols, including mono-, di- and tributenylphenols. The aldehyde utilized, the catalyst concentration, the mole ratio of aldehyde to butenylphenol, the reaction time and temperature (degrees centigrade) are set forth in the following table:

| Aldehyde | Catalyst | Mole Ratio of Aldehyde to Mixed Butenylphenols | Temperature (Degrees C.) and Reaction Time |
| --- | --- | --- | --- |
| Furfural | 3% Sodium Hydroxide | 1:1 | 25° C.—48 hrs. |
| Crotonaldehyde | 4% Sodium Hydroxide | 4:1 | 25° C.—48 hrs. |
| Acetaldehyde | do | 4:1 | 25° C.—48 hrs. |

Example IV

The following materials were charged into a glass lined reactor:

24.6 pounds mixed butenylphenols (monobutenylphenols, di- and tributenylphenols)
27.0 pounds formalin solution (37 percent formaldehyde)
1.7 pounds sodium hydroxide
1.7 pounds water
0.12 pound sodium hydrosulfite The resulting mixture was cooled to 75° F. to 80° F. and the reaction mixture agitated for 5 hours after which it was allowed to stand for 43 hours. The reaction mixture was then acidified to a pH of 5.0 with 68 percent sulfuric acid, and allowed to stand until a water layer settled out. The water layer was then drawn off and discarded. To the wet resin (36.25 pounds) 0.04 pound of an aminotetracarboxylic acid known commercially as Sequestrene AA was added. The resin was then heated to 220° F. and stripped with an inert gas (nitrogen) until a Gardner viscosity of W at 75 percent solids in n-butanol was reached. The resin was then thinned with 10 pounds of n-butanol and filtered at 110° F. The following is the analysis of the final material:

Weight per gallon_____ 8.45 pounds.
Solids_____ 66.2 percent at 110° C.
Viscosity_____ Q to R (Gardner).

The resin thus prepared was roller coated on tin plate and cured at 350° F. for 20 minutes. The resulting film was of a thickness such that the film weighed 16 mgm./4 sq. in., and was light colored, mar-resistant and insoluble in acetone.

*Example V*

One hundred sixty two grams (1 mole) of a mixture of pentenylphenols was placed in a glass lined reactor fitted with a condenser. Sixty-four and eight-tenths grams of formalin solution (0.8 mole formaldehyde) were then added to the pentenylphenols at a temperature of 24° C. Five cc. of concentrated hydrochloric acid were added slowly through the condenser, the temperature rising to 28° C. during the addition of the acid. The reaction mixture was then heated at 95° C. for 2 hours, during which time the reaction mixture was continuously agitated. The reaction mixture was then distilled at reduced pressures until all of the water was removed, the percent solids at that point being 76 percent. A 100 gram sample of the resin was heated and blown with an inert gas at 175° C. The resulting resin was hard and brittle. A second sample was baked at 175° C. for 1½ hours. After cooling the sample was very hard. The total weight of resin obtained from the condensation reaction was 152.0 grams.

*Example VI*

Example V was repeated except that 1 mole of a mixture of cyclopentenylphenols was substituted for the mixture of pentenylphenols utilized in Example V. One hundred fifty-nine and two-tenths grams of a gum-like resin having 95.6 percent solids were obtained. On heating at 175° C. for 1½ hours a very hard, grindable resin was obtained.

*Example VII to Example XII*

A series of varnish compositions was prepared utilizing as the resinous component thereof resinous condensation products of a mixture of alkenylphenols and aldehydes prepared according to the methods of Example IV. The varnish formulations were prepared by heating one-half of the oil with the entire amount of resin until a 15 to 20 inch string was obtained from a cooled drop on a glass surface and then adding the remainder of the oil and continuing the heating until a 20 to 30 inch string is again obtained. The resulting reaction mixture was then added to an equal weight of a high flash naphtha solvent to form the final varnish composition. The oil utilized, the gallon oil length, the butenylphenol-formaldehyde ratio, the reaction time and temperature, the percent solids and the viscosity are set forth in the following table:

| Example | Oil Component | Gallon Oil Length | Molar Ratio Butenylphenol-Formaldehyde | Reaction Time (Mins.) | Reaction Temperature (° C.) | Percent Solids | Gardner Viscosity |
|---|---|---|---|---|---|---|---|
| VII | Linseed | 25 | 2:1 | 40 | 230–240 | 55.7 | E–F |
| VIII | ___do___ | 25 | 1.5:1 | 65 | 280–290 | 53.2 | C |
| IX | Tung | 25 | 1:1 | 65 | 230–240 | 51.1 | S |
| X | ___do___ | 11 | 2:1 | 60 | 170 | 42.1 | A |
| XI | ___do___ | 10 | 2:1 | 50 | 148 | 53.3 | B–C |
| XII | 50% Tung, 50% Linseed. | 25 | 2:1 | 50 | 230 | 50.3 | D–E |

*Example XIII to Example XV*

A series of varnishes was prepared substantially according to the methods of Examples VII through XII, except that the resin utilized in each example was prepared by the acidic condensation of a mixture of butenylphenols with formaldehyde according to the method described in the examples. In each example, the resin and oil were cooked together at a temperature of about 230° C. to 240° C. until a 20 to 30-inch string was obtained after which the resulting reaction mixture was added to an equal quantity of a high flash naphtha solvent. Also, in each example, the oil utilized was linseed oil. The gallon oil length, the drying time, and the impact resistance are set forth in the following table:

| Example | Gallon Oil Length | Drying Time (minutes) | | | Impact Resistance (Inch Pounds) |
|---|---|---|---|---|---|
| | | Set | Cotton Free | Print Free | |
| XIII | 15 | 127 | 277 | 367 | 44 |
| XIV | 20 | 198 | 308 | 468 | 48 |
| XV | 25 | 125 | 275 | 455 | 48 |

Films prepared from the varnish compositions of Examples XIII, XIV, and XV, in addition to possessing the properties listed in the foregoing table, are of a very light straw color, and in this characteristic differ substantially from varnishes in which the resinous component is the condensation product of crotylphenol with an aldehyde such as formaldehyde, the latter varnish composition being of an extremely dark, reddish color.

*Example XVI*

The bodying time required to obtain a useful varnish from a butenylphenol-formaldehyde resin was compared with the bodying time required to produce a useful varnish from a p-tertiary-butylphenol-formaldehyde resin by preparing a varnish from each resin according to the following formulation:

50 grams phenolic resin
97 grams linseed oil

One-half of the linseed oil and all of the p-tertiary-butylphenolic resin were admixed and heated for about 25 minutes at 230° C., after which the remainder of the linseed oil was added. Heating was then continued at a temperature of 230° C. to 235° C. until a per cent solids of 53.3, a Gardner viscosity of B and a Gardner color of 14 were attained. This heating required 420 minutes. The resinous material was then thinned with 118 grams of naphtha and 7 grams of drier added.

One-half of the linseed oil and all of the butenylphenol-formaldehyde resin were admixed and heated to a temperature of 220° C., approximately 10 minutes being required to reach this temperature. The remainder of the linseed oil was then added and heating continued at a temperature of 210° C. to 240° C. until a per cent solids of 55.7, a Gardner viscosity of E–F and a Gardner color of 14–15 were attained. This heating step required only 40 minutes, demonstrating that varnishes prepared from alkenylphenol-aldehyde resins and drying oils such as linseed oil require only a fraction of the bodying time required to obtain useful varnishes from other phenolic resins.

*Example XVII*

Varnishes of the foregoing example were spread as a thin film on a panel and the drying rate determined. The varnish containing the butenylphenol-formaldehyde resin dried to the print free state in only 3 hours, whereas the varnish containing the p-tertiary-butylphenol-formaldehyde resin required 7.8 hours to dry to a print free state. Moreover, the mar-resistance of the varnish containing the butenylphenol-formaldehyde resin was substantially better than that of the varnish containing the p-tertiary-butylphenol-formaldehyde resin.

When the above examples are repeated substituting for the resinous condensation product of a mixture of butenyl-phenols and formaldehyde the resinous condensation products of other alkenylphenols with other aldehydes, good varnish compositions are again obtained. Also, when other drying or semi-drying oils selected from those disclosed hereinabove are substituted for the linseed or tung oil of the above examples, varnish compositions are obtained which are in all respects equivalent to those of the specific examples.

From the foregoing description of the invention and the specific examples, it will be seen that the varnish compositions of the present invention constitute a novel and useful class of coating compositions. It is apparent, therefore, that various embodiments of the invention, in addition to those specifically disclosed, may be provided without departing from the spirit and scope of the invention as defined in the appended claims.

We claim:

1. A light colored varnish composition consisting essentially of the product obtained by heating together a drying oil and the resinous condensation product of formaldehyde and a mixture of butenylphenols containing about 55 percent to 85 percent by weight of ortho- and para-monobutenylphenols, and about 15 percent to 45 percent by weight of di- and tributenylphenols.

2. A light colored varnish composition consisting essentially of the product obtained by heating together a drying oil and the alkaline catalyzed resinous condensation product of formaldehyde and a mixture of butenylphenols containing about 55 percent to 85 percent by weight of ortho- and para-monobutenylphenols, and about 15 percent to 45 percent by weight of di- and tributenylphenols.

3. The varnish of claim 2 wherein the drying oil is linseed oil.

4. The varnish of claim 2 wherein the drying oil is tung oil.

5. A light colored varnish composition consisting essentially of the product obtained by heating together a drying oil and the acid catalyzed resinous condensation product of formaldehyde and a mixture of butenylphenols containing about 55 percent to 85 percent by weight of ortho- and para-monobutenylphenols, and about 15 percent to 45 percent by weight of di- and tributenylphenols.

6. The varnish of claim 5 wherein the drying oil is linseed oil.

7. The varnish of claim 5 wherein the drying oil is tung oil.

References Cited in the file of this patent

UNITED STATES PATENTS

| | | |
|---|---|---|
| 2,006,043 | Dykstra | June 25, 1935 |
| 2,175,393 | Hentrich et al. | Oct. 10, 1939 |
| 2,587,578 | Jones | Mar. 4, 1952 |